United States Patent [19]

Juster et al.

[11] Patent Number: 4,841,586
[45] Date of Patent: Jun. 27, 1989

[54] ADJUSTABLE WATERBED PADDED CAP, FRAME AND PEDESTAL

[76] Inventors: Andrew S. Juster, 2607 Canter Club Trail, Apopka, Fla. 32703; Scott R. Pilato, 511 Georgetown Dr., Casselberry, Fla. 32707

[21] Appl. No.: 70,336

[22] Filed: Jul. 6, 1987

[51] Int. Cl.$^4$ ............................................. A47C 19/04
[52] U.S. Cl. ............................................ 5/181; 5/201; 5/286; 5/400; 5/508; 29/401.1; 403/382
[58] Field of Search ................... 5/451, 452, 450, 400, 5/401, 181, 184, 285, 286, 282 R, 201, 508; 403/382; 29/401.1

[56] References Cited

U.S. PATENT DOCUMENTS

| | | | |
|---|---|---|---|
| 4,402,097 | 9/1983 | Scott | 5/181 |
| 4,507,815 | 4/1985 | Danko | 5/400 |
| 4,597,117 | 7/1986 | Sumner | 5/181 |
| 4,679,261 | 7/1987 | Stanley et al. | 5/184 |
| 4,712,942 | 12/1987 | Brown | 403/403 |

OTHER PUBLICATIONS

"Sunny Nuggets", An Ad on p. 22 of the Jun. '87, Issue of Waterbed Magazine 5/508.

Primary Examiner—Alexander Grosz
Attorney, Agent, or Firm—Edward M. Livingston

[57] ABSTRACT

A new system of waterbed frame and component construction which enables pedestals, frames and padded caps to be put together to form any size waterbed. A pedestal is provided which is extendable by means of inserting extension pieces using special connecting joints in the front and back boards. The insertion of such extension pieces in the front and back boards converts a super single size waterbed pedestal to a Queen or King size bed. Similarly, specially designed padded caps and extension pieces makes the end rail padded cap adjustable to fit any size of waterbed. Furthermore, the same concept of extension pieces is used to form the frame as well. Thus, this new system of waterbed component construction reduces the cost and problems of shipping and inventory involved with prior waterbed frame construction.

9 Claims, 3 Drawing Sheets

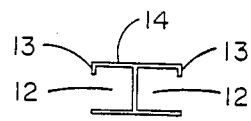
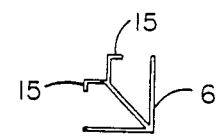
FIG. 4　　　　　FIG. 5　　　　　FIG. 6
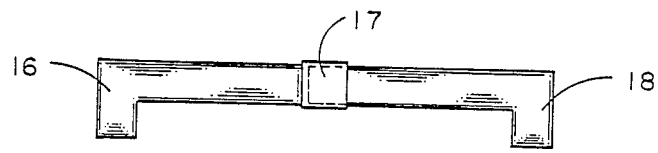
FIG. 7
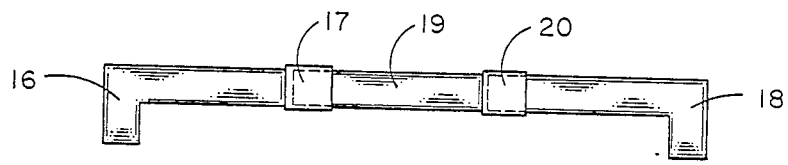
FIG. 8
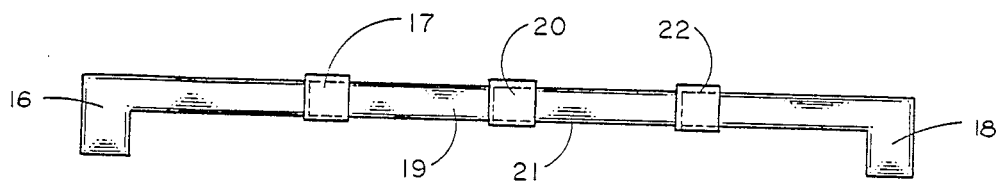
FIG. 9
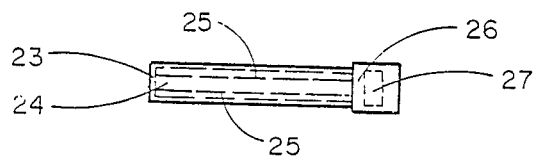
FIG. 10

ADJUSTABLE WATERBED PADDED CAP, FRAME AND PEDESTAL

BACKGROUND OF THE INVENTION

This invention relates to waterbeds and more particularly to the construction of pedestals, frames and padded caps for waterbeds.

Normally, waterbeds are manufactured in three different standard sizes, super single, queen and king, hereinafter further referred to as "SS", "Q" and "K", respectively. The components of a waterbed, in addition to the mattress liner and heater, generally consist of a pedestal (a rectangular shaped box on the bottom), decking, frame, headboard, and padded caps to cover the frame.

Currently due to the three different sizes of waterbeds, it is necessary to manufacture and carry an inventory of components for all three sizes, SS, Q and K. In addition to the extra inventory, the distributor and retailer must try to predict what sizes are going to sell, so they must order the correct numbr of each size. Also because of the size of Q and K components, shipping expenses are greater and often limited to common carriers rather than less costly and faster alternatives, such as United Parcel Service. Furthermore, the wholesale price of padded caps is greater with current industry practice. Thus, as a result of the foregoing, distributors and retailers must stock more inventory of all three sizes to cover runouts thereby incurring extra costs for shipping, warehousing and administration.

Numerous prior patents have dealt with waterbed construction and even more specifically, components, such as U.S. Pat. Nos. 4,089,497 by Miller, et al.; 4,554,039 by James; 4,514,871 by Fisher, et al.; and 4,389,741 by Larson. Unfortunately, none of these aforementioned patents have attempted to resolve the problems associated with waterbed frames and component construction.

The instant invention resolves the aforementioned problems associated with waterbed frame and component construction by providing small inserts or elements, referred to as "Nuggets", to extend the widths of pedestals, frames and padded caps. These socalled nuggets enable the waterbed pedestal, frames and padded caps to be adapted to form any of the three sizes of waterbeds, be it SS, Q, or K. Since waterbeds are all the same length, but vary in width, this invention deals primarily with adjusting the width of various waterbed components, such as the pedestal, frame and padded end caps. The pedestal or frame construction, described in this invention, consists of a basic set of four boards which, when joined together by corner extension brackets, form a SS size pedestal or frame and, when combined with short sections of preferably one foot in length, convert the SS size pedestal or frame bed to a Q or K size pedestal or frame. The same concept applies to the padded cap construction which utilizes standard corner pieces to form a SS size padded end cap, with shorter pieces being used in varying numbers to extend the padded end rails to fit a Q or K size bed.

Thus, the method of construction of waterbeds embodied by this invention reduces inventory requirements as well as the costs associated with manufacturing waterbed pedestals, frames and padded caps. By this invention waterbed frames and components can be quickly adjusted to make all sizes of waterbeds. In addition, this invention reduces shipping costs by reducing the size of shipping containers and by enabling the waterbed retailer or distributor to ship by alternatives to common carriers, such as United Parcel Service and by reducing damage to components which appears to occur more often to larger shipping parcels. At the same time, the padded caps, which are also part of this invention, provide for a more decorative appearance than standard one piece padded caps in current use.

SUMMARY OF THE INVENTION

The primary object of this invention is to provide a new system of waterbed frame and component construction which eliminates the requirement to manufacture pedestals, frames and padded caps in different sizes to fit the three sizes of waterbeds.

A second object of this invention is to reduce the price of padded caps.

A corollary object of this invention is to reduce the inventory of waterbed components that retailers and distributors must carry.

A further object of the invention is to simplify inventory ordering and accounting since it will no longer be necessary to order different sizes and predict what size of waterbeds will sell.

Another object of the invention is to reduce warehouse space requirements necessary for waterbed distributors and retailers.

An even further object of the invention is to reduce shipping costs of waterbed components.

Also, an additional object of the invention is to provide more decorative padded caps for waterbed end rails.

The invention which is disclosed herein meets the above and additional objects by providing a basic set of super single ("SS") size pedestals, frames and padded caps, and small extension pieces which join together to form Q or K size waterbed pedestals, frames and padded caps. For instance, to form a Q size waterbed, padded cap end rail, only only 1-foot nugget piece and two corner pieces would be used. Further, to form a K size padded cap and rail, another 1-foot nugget section is used. The padded caps are extended by inserting small extensions which are secured to each other by overlapping flaps containing spring steel or other fastening material. At the same time, these overlapping flaps provide a more decorative touch to the otherwise standard rails. This concept of component construction applies to pedestals and frames as well.

Additional objects and advantages of this invention will become more readily apparent from the following detailed description of the preferred embodiments in conjunction with the accompanying drawings.

BRIEF DESCRIPTION OF THE DRAWINGS

The drawings appended to this application are as follows:

FIG. 4 is an enlarged side view of a pedestal extension piece;

FIG. 5 is the top view of the extension joint connection for the pedestal;

FIG. 6 is a top view of the corner connection joint;

FIG. 7 is a top view of the padded end rail cap for a super single size waterbed;

FIG. 8 is a top view of a padded end rail cap extended to fit a queen size waterbed;

FIG. 9 is a top view of the padded end rail cap extended to fit a king size waterbed; and FIG. 10 is a top plan view of the extension piece for the padded end cap.

DETAILED DESCRIPTION OF THE PREFERRED EMBODIMENTS

Figure 1:
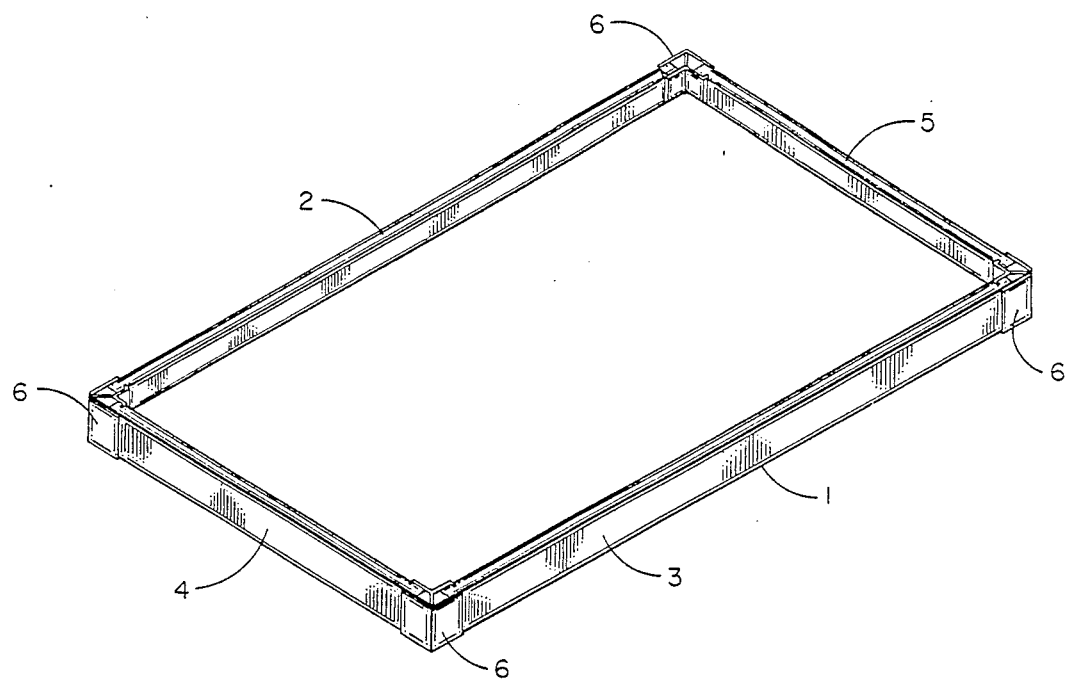
FIG. 1 is a perspective view of a basic super single waterbed pedestal without any supporting inserts.

Referring now in detail to the drawings, FIG. 1 shows the standard waterbed pedestal 1 which essentially is a four sided rectangularly shaped box having two side boards of equal length, 2 and 3, and two shorter ends of equal length, 4 and 5, said sides being connected by corner joints 6. Said pedestal 1 is used to support the rest of the waterbed.

Figure 2:
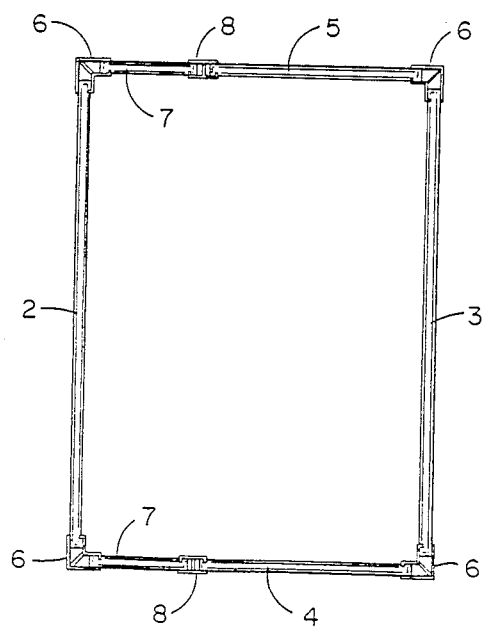
FIG. 2 is a top view of a queen size pedestal formed by the invention.

The super single size pedestal shown in FIG. 1 can be expanded to form a queen size pedestal as shown in FIG. 2. This expansion in size is accomplished by using a specially designed extension element, two such elements being inserted in the back end rail 5 and the front end rail 4 at the corner joints 6.

Figure 3:
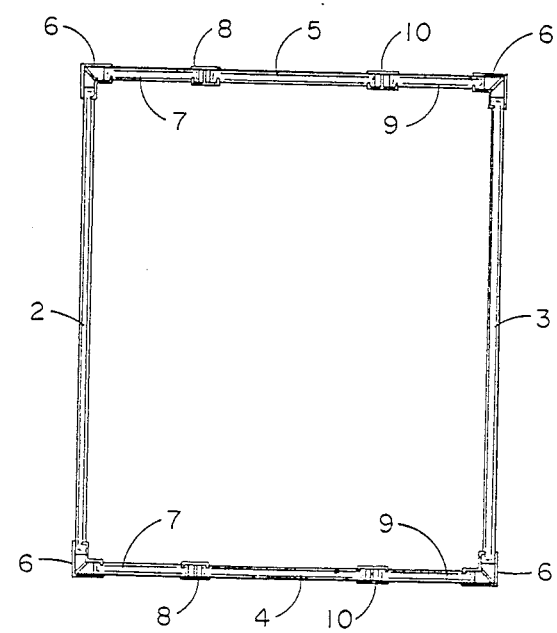
FIG. 3 is a top view of the king size pedestal formed by the invention.

Furthermore, as shown in FIG. 3 the pedestal can even be expanded to even fit under a king size waterbed merely by the insertion of two more extension elements 9 in the front and back rails, 4 and 5, at the opposite corner joints 6 of the pedestal 1.

These specially designed extension elements or pieces are illustrated better in the enlarged side view of FIG. 4. In FIG. 4 the extension piece is shown to have grooves 11 on each end. Such grooves may be unnecessary if pressure fitting is used to secure the pieces in place.

The extension connection joints 8 and 10 in FIG. 3 and also in the enlarged view of FIG. 5 are specifically designed to connect the extension pieces 7 and 9 securely to the end rails 4 and 5. These connection joints may contain lips 13 on the reverse sides 14 thereof. These lips 13 are designed to fit into the grooves 11 when placed over the extension pieces 7 and 9 with the rest of the extension piece fits into the open area 12. The other end of the end rail fits into the opposite open area 12.

In addition to the specially designed extension connection joints 8 described above, special corner joints as shown in FIG.6 are used. These corner joints also have lips 15 pointing inward on each of their perpendicular legs so that these lips 15 will also fit over the grooves contained in the end rails 4 and 5 or in the extension pieces, 7 and 9. These extension connection joints and corner joints may be made of metal or heavy plastic.

As described above, the adjustable waterbed pedestal provides significant cost savings to the retailer and distributor of waterbeds. These cost savings are realized because no longer does a retailer have to stock different sizes of pedestal boards 4 and 5 for different sizes of beds. By merely stocking the basic super single size pedestal boards with extension pieces and connection and corner joints any of the three sizes of waterbed pedestals can be easily and quickly assembled.

The same method of constructing waterbeds as described above can also be applied to the pedestal side boards 2 and 3 as well, thereby enabling all components of a waterbed to be shipped in a rather compact package directly to the distributor or even through mail order to the homeowner for easy and quick assembly to form any size of waterbed. Even further, waterbed frames (not shown in the drawings) are expandable using similar extension pieces and connection joints.

The remaining drawings show the same component concept as applied to the padded caps that fit over the front end rails 4 and side rails 2 and 3 of a waterbed frame. Since the top of the rails of a waterbed frame are uncomfortable and unsightly, padded caps must be placed over the top of such rails to provide more comfort and be decorative as well. Unfortunately, without the method of construction as disclosed by this invention, three sizes of padded caps must be maintained in stock by a waterbed retailer or distributor. On the contrary, as disclosed by this invention the basic super single size padded end rail caps comprised of two corner pieces 16 and the right corner piece 18 as shown in FIG. 7. A female corner piece 16 shown on the left side illustrated in FIG. 7, has a flap 17 which overlaps the front end of the other "male" corner piece 18. On the inside of this connecting flap 17 is fastening or connecting material which secures the flaps 17 over the female end of the corner piece 18. Preferably the fastening material is a piece of spring steel 27 or hook and loop fastening material. This padded end rail cap can be extended to fit any size of waterbed by the insertion of padded extension end rail pieces. For instance, inserting one extension piece 19 with its own connecting flap 20 fits a Q size waterbed as shown in FIG. 8 and a second extension piece 21 makes a K size waterbed as shown in FIG. 9.

A enlarged plan view of such a padded end cap extension piece is shown in FIG. 10. The flap 26 contains fastening or connecting material, such as a piece of spring steel 27. The outer covering 23 on these extension pieces, 19 and 21 and the corner pieces, 16 and 18, of the padded end rail cap may be made of vinyl or cloth, which wraps around foam padding and, in turn the wood, plastic, fiberboard or suitable material which forms on the top 24 and sides 25 of the padded end rail.

Figure 11:
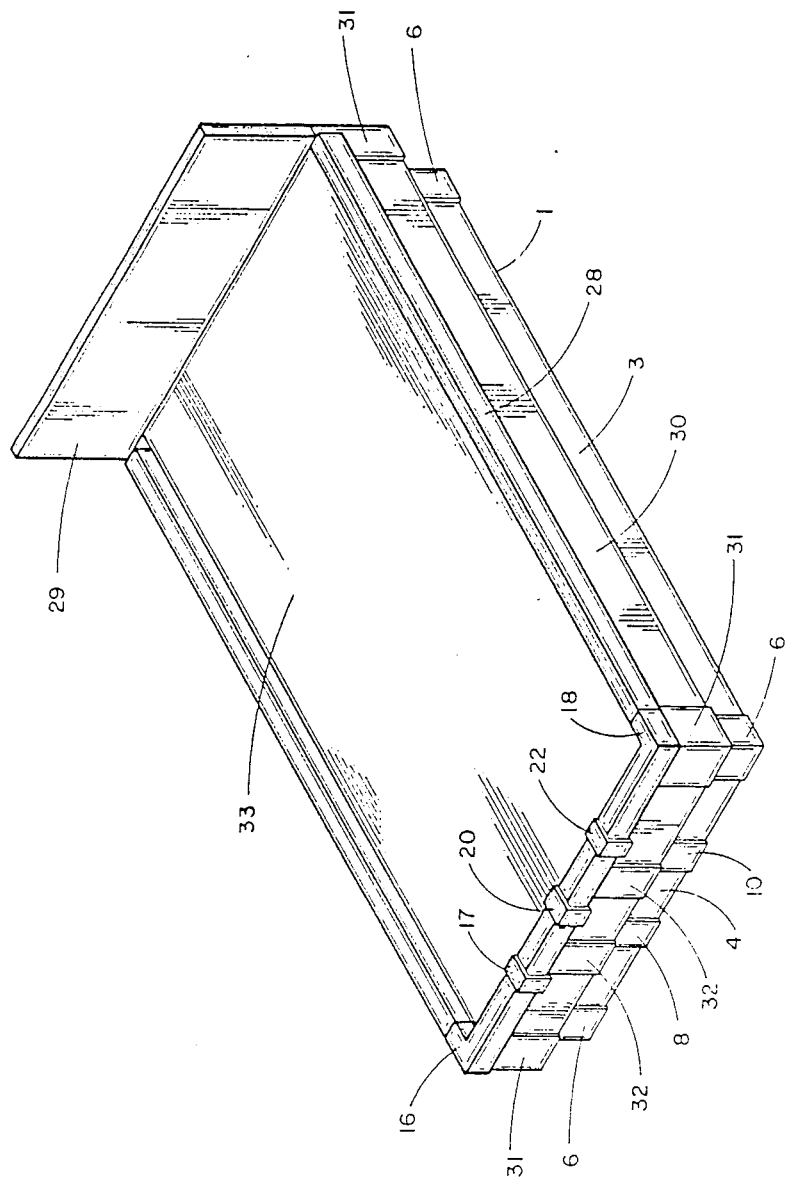
FIG. 11 is a perspective view of a waterbed using the instant invention, showing in combination an extensible pedestal, an extensible frame and extensible mated padded caps.

The perspective view in FIG. 11 shows an entire waterbed as it might appear using the invention consisting of an extensible pedestal 1, an extensible frame 30, and extensible mated pads 28 of this invention. The components as set forth and described hereinabove when referring to other drawings of the pedestal 3 or pad system 28 are also shown. The extensible frame 30 has frame corner joints 31, which, except for size, are similar to the pedestal corner joints 6. Also shown on the frame 30 are frame extension connection joints 32, which once again are similar, except for size, to the pedestal extension joints 8 and 10. Thus, by utilizing the instant invention comprising the extensible components for the pedestal, frame and pads, the consumer can adjust the size of a waterbed as desired or as needs change, with probably the only components of the bed needing to be purchased being the mattress 33 and the head board 29, although even the head board 29 itself could also be made one large size to fit any waterbed.

As described in detail above, it should be apparent that there has been provided a new system of waterbed frame and component construction which eliminates the requirement to manufacture most waterbed components, such as pedestals, frames and padded caps in different sizes in order to make super single, queen and king size waterbeds. This system of waterbed construction is made possible by specifically designed extension pieces, connecting joints and corner brackets for the pedestals, and specifically designed extension pieces to form padded caps.

This system offers numerous advantages over prior waterbed frame and component construction among which are to reduce inventory that distributors and retailers must carry, to simplify ordering and accounting for various sizes of parts, and to make any size of waterbed easy and quick to assemble. In addition, since the waterbed package can be shipped in a smaller package shipping costs are reduced. Moreover, the padded caps provided herein are more decorative than standard padded caps. All the above yield significant cost savings to the distributor, retailer and ulitmately, the customer.

While certain specific embodiments of the invention have been described in detail hereinabove, it is to be understood that various modifications may be made from the embodiments hereinabove described, such as the system may be applied to other construction as well, without departing from the spirit and scope the invention as set forth in the appended claims.

Having described in detail our invention, we claim the following:

1. An adjustable waterbed comprising:
   a. a pedestal consisting of two side boards and two end boards connected by corner joints, said end boards being extendable in length to make any size pedestal by the insertion of short extension pieces having the same width as the boards and having grooves near each end thereof, and being secured to the boards by rigid Ishaped pieces, each having front and back surfaces separated by a perpendicular section between said surfaces, the back surfaces having inwardly pointing lips or ridges on the outermost side thereof, said lips fitting into matching grooves on the boards and extension pieces;
   b. an adjustable frame consisting of side and end boards, said end boards being extendable in length by insertion of extension pieces; and
   c. padded caps to cover the end boards of the frame, said padded caps being able to fit any size frame by insertion of padded extension elements.

2. The adjustable waterbed of claim 1 wherein the extension pieces for the boards of the frame comprise short pieces having the same width as the boards, said extension pieces having grooves near each end thereof.

3. The adjustable waterbed of claim 1, wherein the extension pieces are pressure fitted with the boards of the pedestal.

4. The adjustable waterbed of claim 1 wherein the padded caps on the end boards of the frame comprise two L-shaped padded pieces, each piece being connected together by a flap on the end of one padded piece which overlaps and attaches to the end of the other padded piece by fastening means.

5. The adjustable waterbed of claim 4 further comprising padded extension elements which are inserted between the two L-shaped pieces by fitting one end of a padded extension element under the flap of one of said L-shaped pieces, said padded extension element having a flap on the opposite end which fits over and secures said padded extension element to the end of the remaining L-shaped piece.

6. A method of constructing an adjustable waterbed comprised of:
   a. assembling a pedestal having side rails and end boards connected together by corner joints, said end boards being extendable in length by the insertion of extension pieces; and
   b. assembling a frame having end boards extendable in length by the insertion of extension pieces; and
   c. attaching padded caps and padded extension pieces on the end boards of the frame, said padded caps being able to fit any size end boards by inserting padded extension pieces between the padded caps.

7. A waterbed having a pedestal consisting of two side rails and two end boards connected at the corners,
   a frame having two side rails and end boards connected together at the corners and mounted on top of said pedestal
   and further comprising padded caps and padded extension pieces to cover the end boards of the frame and provide a surface for comfortable seating on said frame,
   said padded caps being able to fit any size of frame by insertion of padded extension elements between the padded cap portions.

8. The waterbed of claim 7 wherein the padded caps on the end boards of the frame comprise two L-shaped padded pieces, each piece being connected together by a flap on the end of one padded piece which overlaps and attaches to the end of the other padded piece by a fastening means.

9. The waterbed of claim 8 further comprising padded extension elements which are inserted between the two L-shaped pieces by fitting one end of a padded extension element under the flap of one said L-shaped pieces, said padded extension element having a flap on the opposite side which fits over and secures said pad extension element to the end of the remaining L-shaped piece.

* * * * *